United States Patent
Rowlands et al.

(10) Patent No.: US 7,323,692 B2
(45) Date of Patent: Jan. 29, 2008

(54) FLAT-PANEL DETECTOR WITH AVALANCHE GAIN

(75) Inventors: John A. Rowlands, Toronto (CA); Wei Zhao, East Setauket, NY (US)

(73) Assignees: Research Foundation of State University of New York, Albany, NY (US); Sunnybrook and Woman's College Health Sciences Center (CA)

( * ) Notice: Subject to any disclaimer, the term of this patent is extended or adjusted under 35 U.S.C. 154(b) by 84 days.

(21) Appl. No.: 11/201,658

(22) Filed: Aug. 10, 2005

(65) Prior Publication Data

US 2006/0054835 A1 Mar. 16, 2006

Related U.S. Application Data

(60) Provisional application No. 60/600,313, filed on Aug. 10, 2004.

(51) Int. Cl.
*G01T 1/20* (2006.01)
(52) U.S. Cl. .............. 250/370.09; 250/370.11; 250/371
(58) Field of Classification Search ........... 250/370.09, 250/370.11, 371
See application file for complete search history.

(56) References Cited

U.S. PATENT DOCUMENTS 5,198,673 A 3/1993 Rougeot et al.
5,739,522 A * 4/1998 Ouimette .............. 250/214 VT
6,078,643 A * 6/2000 Vogelsong et al. ......... 378/98.2

OTHER PUBLICATIONS

Wei Xhao et al.;"Indirect Flat-Panel Detector with Avalanche Gain"; Medical Imaging 2004;Physics of Medical Imaging 15-17; Feb. 2004, San Diego, CA. USA; SPIE—The International Society for Optical Engineering SPIE-Int.; Soc. Opt. Eng USA; ISSN: 0277-786X.

Hunt, Dylan C; "X-Ray Imaging with Amorphous Selenium: X-Ray to Charge Conversion Gain and Avalanche Multiplication Gain"; Medical Physics, American Institute of Physics, New York, US; vol. 29; No. 11; Nov. 2002; pp. 2464-2471, XP012011640; ISSN: 0094-2405.

* cited by examiner

*Primary Examiner*—David Porta
*Assistant Examiner*—Mark R Gaworecki
(74) *Attorney, Agent, or Firm*—The Farrell Law Firm, PC

(57) ABSTRACT

The present invention is an indirect AMFPI wherein a phosphor such as a structured cesium iodide (CsI) is used to convert x-ray energy to optical photons or a charge, which is then detected by a two-dimensional array of either thin-film transistors (TFTs) such as an amorphous a-Se TFTs or a photodiode array. A scanning control circuit generates pulses to turn on the TFTs one row at a time, and thus the charge in the individual arrays is transferred from the TFT to one or more external charge-sensitive amplifiers. The charge-sensitive amplifiers are shared by all the pixels in the same column. The two-dimensional array can be read in real time.

17 Claims, 7 Drawing Sheets

FLAT-PANEL DETECTOR WITH AVALANCHE GAIN

PRIORITY

This application claims priority to U.S. Provisional Application Ser. No. 60/600,313, filed on Aug. 10, 2004, the contents of which are hereby incorporated by reference.

GOVERNMENT RIGHTS

This invention was made with Government support under Contract No. 1R01EB002655-01 awarded by the National Institutes of Health. The U.S. Government has certain fights in the invention.

BACKGROUND OF THE INVENTION

1. Field of the Invention

The present invention relates generally to flat-panel imagers for X-ray imaging, and more particularly to an active matrix flat panel imager.

2. Description of the Related Art

Active matrix flat-panel imagers (AMFPI) based on active matrix thin film transistor (TFT) arrays are the most promising technology for digital x-ray imaging due to their compact size, rapid readout, and better imaging performance than screen films. Active panel imaging based on flat-panel imagers are well known in the art. AMFPI are categorized as either direct or indirect based on the materials used for x-ray detection (x-ray photoconductors or scintillators, respectively).

FIG. 1 is a perspective view illustration of a conventional AMFPI with direct detection. The AMFPI employs a uniform layer of x-ray-sensitive photoconductor, e.g., amorphous selenium 101 (a-Se), to directly convert incident x-rays to a charge. Each pixel storage capacitor 109 stores each pixel charge. The charge is then electronically read out by a two-dimensional array of amorphous Silicon (a-Si) thin-film transistors 103 (TFT). During readout, a scanning control circuit 105 generates pulses to turn on TFTs one row at a time, and to transfer the image charge from the pixel to external charge-sensitive amplifiers 107. These amplifiers are shared by all the pixels in the same column. Advantages of the direct method include higher image resolution and simpler TFT array structure that can be manufactured in a standard facility for active matrix liquid crystal displays (AMLCD).

FIG. 2 is a perspective view illustration of a conventional AMFPI with indirect detection. A phosphor screen 201 is laminated upon a two-dimensional array such that one planar surface of the phosphor can be radiated by incident x-rays and the opposite planar surface of the phosphor can transfer photons which are detected by the adjacent photodiode array 203. Suitable phosphor screens include structured cesium iodide (CsI). In operation, the phosphor screen converts incident x-ray radiation to optical photons, which are detected by the photodiode array and are then converted to charge by integrated photodiodes at each pixel of the TFT array 205. A scanning control circuit 207 then generates pulses to turn on the photodiodes one row at a time, and to transfer the image charge from the pixel to external charge-sensitive amplifiers 209. These amplifiers are shared by all the pixels in the same column.

Both AMFPI methods offer better image quality than screen films and computed radiography (CR).

Existing flat-panel imagers (FPI), which are the dominant technology for digital x-ray imaging, have two major difficulties to overcome: the ability to generate good image quality at very low dose, such as in the dark part of a fluoroscopy image (~0.1 mR per frame) or behind dense breast tissue in mammography, and the ability to produce images at a high frame rate without artifact, especially when the radiation exposure is switched from radiographic to fluoroscopic. This is because of the "ghost" generated by the previous exposures.

Several strategies exist for improving the low-dose performance of FPI. These can be divided into two categories: increasing the x-ray image charge conversion gain so that the signal can overcome the electronic noise, and decreasing the electronic noise. Theses strategies are common to both types of FPI since they have approximately the same conversion gain and pixel electronic noise. Comparing the two approaches, increasing the gain has the potential for generating more significant improvement.

One known method of increasing the gain for direct FPI is to use photoconductors with higher conversion gain, e.g., lead iodide ($PbI_2$) or mercuric iodide ($HgI_2$), which have conversion gains 5-7 times higher than that of amorphous Selenium (a-Se). One of the practical problems of having large gain is that the signal charge, especially at high exposure, requires a large pixel storage capacitor (>15 pF), which is impractical to produce especially for small pixel sizes. This means that a detector for low dose x-ray imaging applications may not work properly with a high radiation dose, which compromises the dynamic range of the system and its clinical applications.

To reduce electronic noise, several investigators have proposed advanced pixel designs, which incorporate pixel amplification by adding at least two more TFTs at each pixel. This has been found to be impractical to implement the complex pixel design over a large area with consistent and uniform imaging performance because each pixel operates as an analog amplifier circuit as opposed to the simple switching device (digital) in existing AMFPI.

SUMMARY OF THE INVENTION

Due to these practical challenges none of the above approaches for increased gain and reduced electronic noise has been implemented in commercial, large-area, active matrix, flat-panel imagers.

Accordingly, it is an aspect of the present invention to provide a system to generate good image quality at very low dose.

It is another aspect of the present invention to provide a system to generate good image quality behind dense breast tissue in mammography.

It is a further aspect of the present invention to provide a system to produce images at a high frame rate without artifact, especially when the radiation exposure is switched from radiographic to fluoroscopic.

In order to accomplish these and other aspects and objects, there is provided a flat panel detector that includes a phosphor screen for receiving x-rays and converting the x-rays into optical photons, an avalanche photoconductor for receiving the optical photons and for converting the optical photons into electrical charges, and an active matrix array for detecting the electrical charges, wherein the phosphor screen is preferably structured cesium iodide (CsI), the avalanche photoconductor is preferably amorphous selenium (a-Se), the active matrix array is preferably comprised of one of thin film transistors and field emitters.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
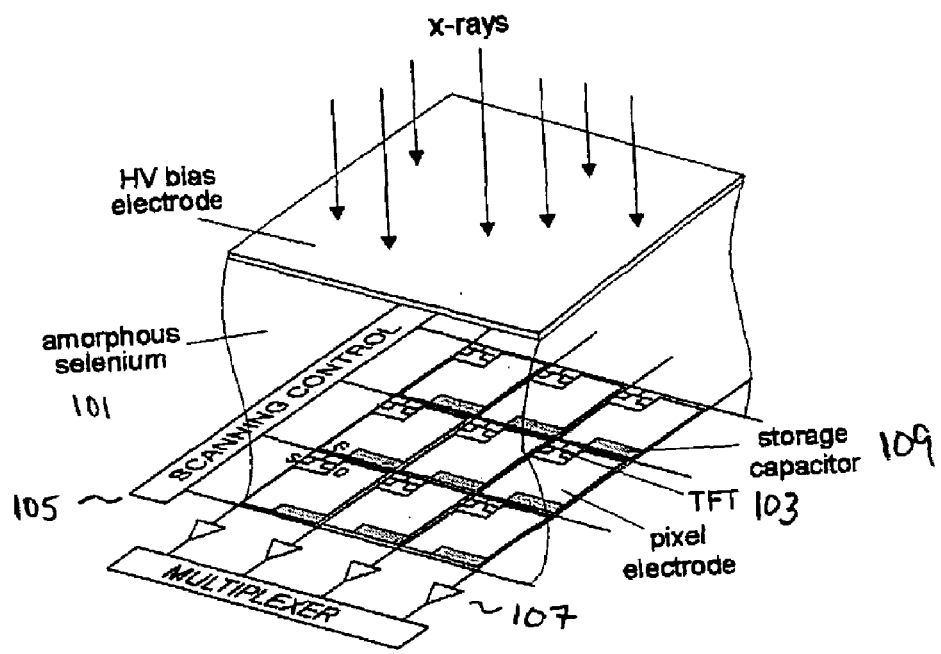
FIG. 1 is a perspective view illustration of a conventional AMFPI with direct detection.
Figure 2:
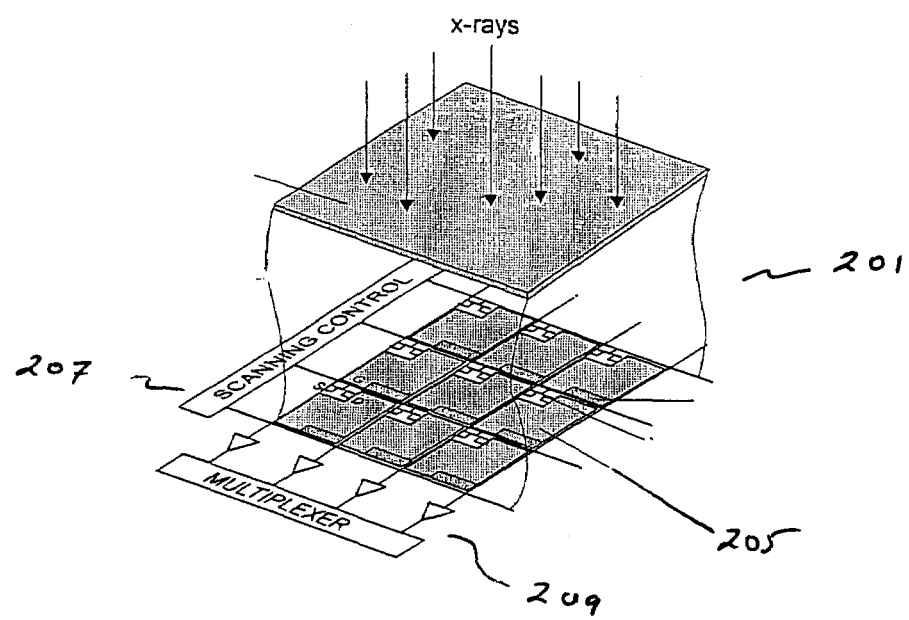
FIG. 2 is a perspective view illustration of a conventional AMFPI with indirect detection.

Hereinafter, preferred embodiments of the present invention will be described with reference to the accompanying drawings. In the following description, the same or similar elements will be designated by the same reference numerals although they are shown in different drawings. The detailed description of known functions and configurations incorporated herein will be omitted when it may make the subject matter of the present invention unclear.

An indirect flat-panel imager (FPI) with avalanche gain is presented for use in applications for low-dose x-ray imaging. It is made by optically coupling a structured x-ray scintillator CsI to an amorphous selenium (a-Se) avalanche photoconductor, also referred to as a high-gain avalanche rushing photoconductor (HARP). The final electronic image is read out using an active matrix array of thin film transistors (TFT). The detector using TFTs is referred to as the scintillator HARP active matrix flat panel imager (SHARP-AMFPI). The advantage of the SHARP-AMFPI is its programmable gain, which can be turned on during low dose fluoroscopy to overcome electronic noise, and turned off during high dose radiography to avoid pixel saturation.

An important design consideration for the SHARP-AMFPI is such as avalanche gain, which depends on both the thickness $d_{Se}$ and the applied electric field $E_{Se}$ of the HARP layer. To determine the optimal design parameter and operational conditions for HARP, the $E_{Se}$ dependence of both avalanche gain and optical quantum efficiency of an 8 m HARP layer was measured. The results were used in a physical model of HARP as well as a linear cascaded model of the FPI to determine the following x-ray imaging properties in both the avalanche and nonavalanche modes as a function of $E_{Se}$: (1) total gain, which is the product of avalanche gain and optical quantum efficiency; (2) linearity; (3) dynamic range; (4) gain nonuniformity resulting from thickness nonuniformity; and (5) effects of direct x-ray interaction in HARP. A HARP layer thickness of 8 m can provide adequate avalanche gain and sufficient dynamic range for x-ray imaging applications to permit quantum limited operation over the range of exposures needed for radiography and fluoroscopy.

The present invention is an indirect AMFPI wherein a phosphor such as a structured cesium iodide (CsI) is used to convert X-ray energy to optical photons or a charge, which is then detected by a two-dimensional array of either thin-film transistors (TFTs) or a photodiode array (as is common in digital photographic equipment). Individual TFTs ate known as pixels. A scanning control circuit then generates pulses to turn on the TFTs one row at a time, and thus the charge in the individual arrays is transferred from the TFT to one or more external charge-sensitive amplifiers. The charge-sensitive amplifiers are shared by all the pixels in the same column. Each row of the detector takes about ~20 μS to read. Hence a two-dimensional array (detector) with 1000 by 1000 pixels can be read in real time (i.e. 30 frames per second). Devices incorporating the two-dimensional TFT array are known as direct detection AMFPIs, while devices using the two-dimensional array of integrated photodiodes are known as indirect AMFPIs. According to another embodiment of the present invention, the FPI incorporates a field emitter array (FEA) to detect the photons or charge.

The proposed detector has the following advantages: (1) programmable gain by changing the electric field $E_{Se}$ as opposed to the fixed high conversion gain of HgI2 or PbI2. With SHARP-AMFPI, by appropriately decreasing the $E_{Se}$ during high exposure applications, the signal charge is comparable to that at low dose with avalanche gain, which simplifies the TFT array pixel design and permits a detector with wide dynamic range; and (2) better temporal performance because both charge carriers in a-Se have adequate range and the probability of charge trapping is low. This is in contrast to the very short range of one type of carriers in PbI2 (electrons) and HgI2 (holes), which results in significant charge trapping and ghosting. The advantages described herein make the proposed detector suitable for all x-ray imaging modalities (i.e., radiography and fluoroscopy).

Figure 3:
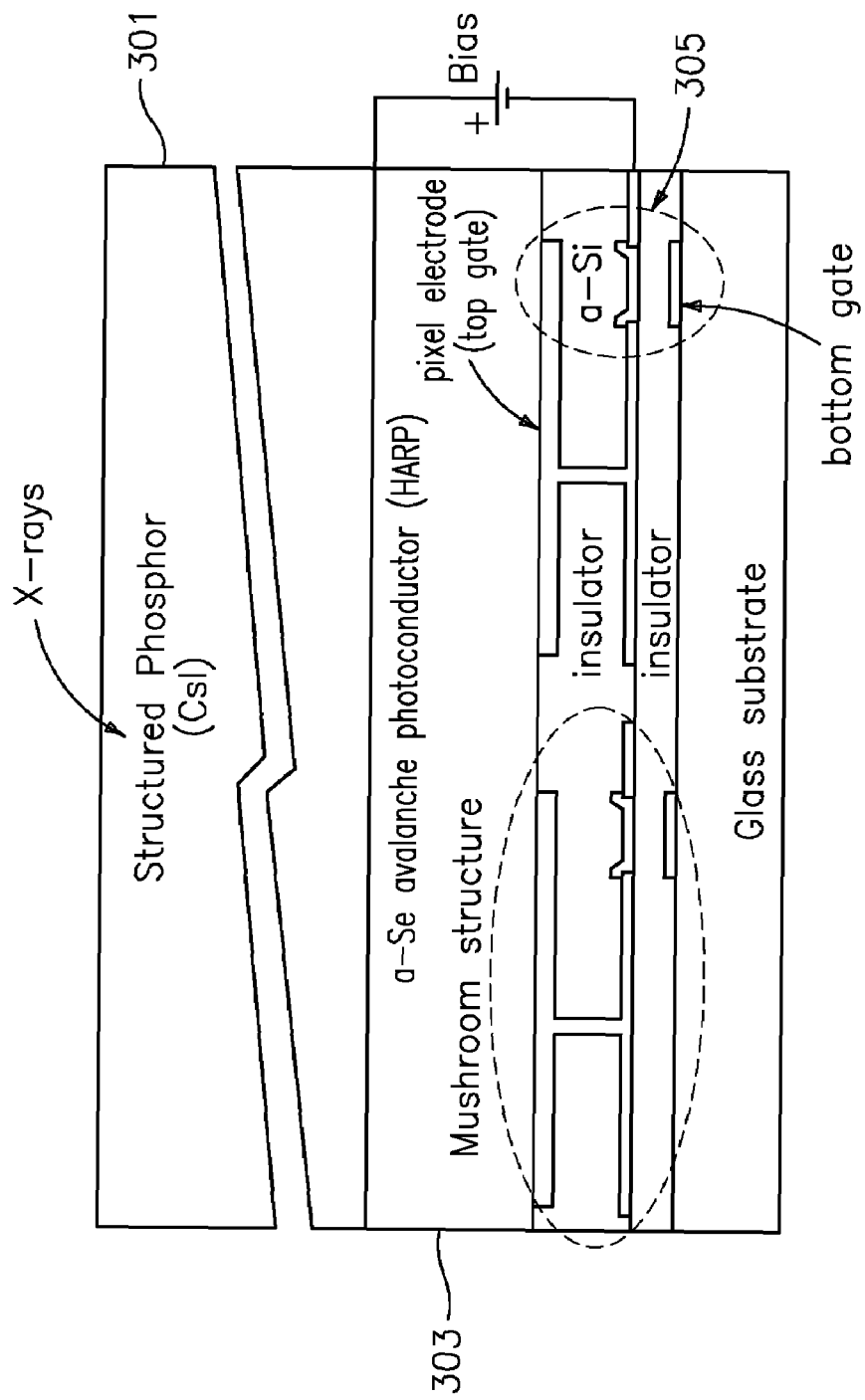
FIG. 3 is a cross-sectional view illustration of a flat-panel detector with avalanche gain according to an embodiment of the present invention.

FIG. 3 is a cross-sectional view illustration of a flat-panel detector with avalanche gain according to an embodiment of the present invention. The FPI includes a structured phosphor 301 (e.g., CsI) that is laminated upon an a-Se avalanche photoconductor 303, or High-gain Avalanche Rushing amorphous Photoconductor (HARP). A TFT array 305 is in communication with the a-Se avalanche photoconductor 303 such that a charge image can be transferred from the a-Se avalanche photoconductor 303 to the TFT array 305. In use, light generated by the CsI layer 301 is detected with the avalanche a-Se photoconductor 303, which can increase the photoconductive gain by two orders of magnitude. The charge image created by the a-Se 303 can then be electronically read out using the TFT array 305, which is identical to that used in existing FPIs. A detector using this readout method will be referred to as a Scintillator-HARP Active Matrix Flat Panel Imager (SHARP-AMFPI).

Figure 4:
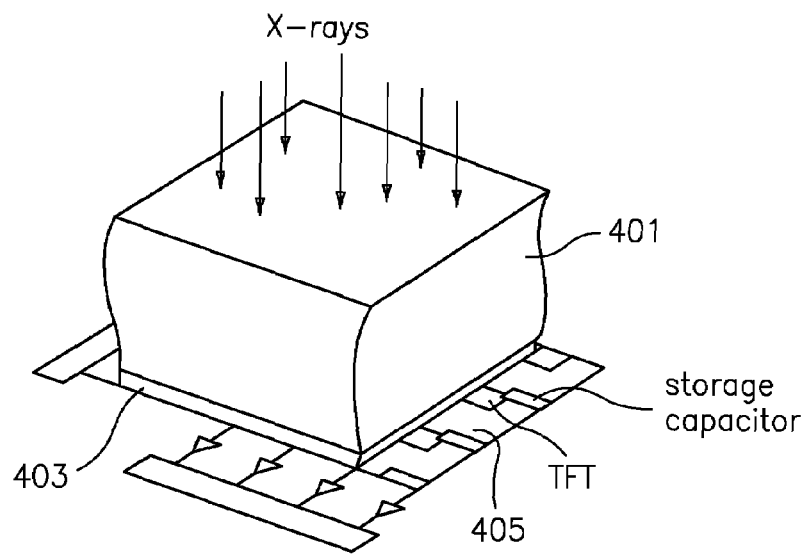
FIG. 4 is a perspective view illustration of flat-panel detector with avalanche gain according to an embodiment of the present invention.

FIG. 4 is a perspective view illustration of flat-panel detector with avalanche gain according to an embodiment of the present invention. The diagram shows the concept of SHARP-AMFPI, where an avalanche photoconductor is used to detect light photons generated by CsI. The optical photons emitted from the CsI layer 401 upon absorption of x rays are detected and amplified by an avalanche a-Se photoconductor 403, also referred to as a high-gain avalanche rushing photoconductor (HARP). Light photons absorbed by the HARP layer 403 generate electron-hole pairs near the top interface 0.1 m. Under a sufficiently high electric field produced by applying positive voltage on the top bias electrode of the a-Se layer 403, holes moving toward the bottom surface will undergo avalanche multiplication and create more holes and electrons. The avalanche gain ranges from unity up to 1000 times depending on electric field and the thickness of the a-Se layer 403. The electrons move to the top bias electrode while the pixel electrodes 405 collect the holes and form a charge image, which is readout with a two-dimensional array of TFTs 407, similar to that in existing AMFPI.

Figure 5:
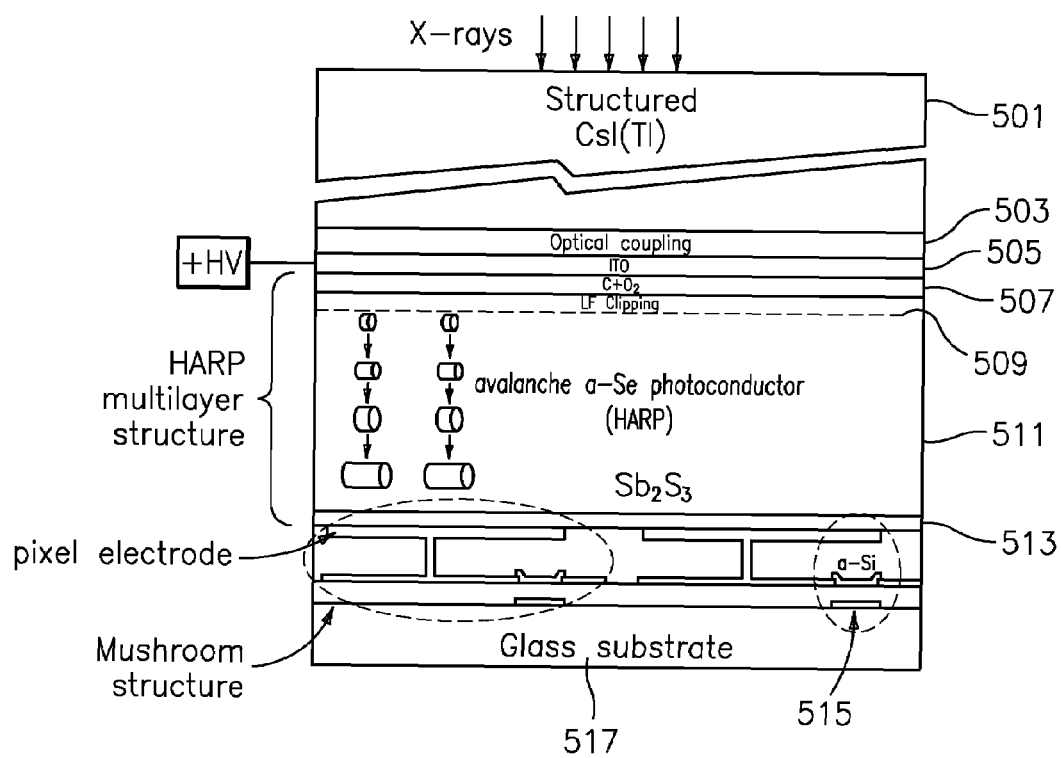
FIG. 5 is a cross-sectional view illustration of a flat-panel detector with avalanche gain according to another embodiment of the present invention.

FIG. 5 is a cross-sectional view illustration of a flat-panel detector with avalanche gain according to another embodiment of the present invention. The structured CsI(TI) 501 is optically coupled to a transparent indium tin oxide (ITO) electrode 505 by optical coupling 503. The ITO electrode is biased positively during imaging. A thin layer (~20 nm) of cerium oxide ($C_eO_2$) 507 is provided. A thin layer of lithium fluoride (LiF) doped a-Se 509 to block injection of holes from the ITO. The intrinsic a-Se photoconductor 511 is from 0.5 to 35 m thick depending on the desired avalanche gain. The bottom interface of the HARP structure is a submicron thin layer of antimony trisulfide ($Sb_2S_3$) 513, which is used to block electron injection from the negative bias electrode (i.e. pixel electrodes of the TFT array 515). Since the mobility of holes in a-Se is more than 30 times higher than that of electrons, only holes create a significant number of carriers by impact ionization. Hence it is essential for light photons to enter from the positive bias electrode. A glass substrate 517 is provided as the base of the device.

A detector using the FEA readout method according to another embodiment of the present invention is known as a Scintillator-Avalanche Photoconductor with High Resolution Emitter (SAPHIRE) readout. All of the detector components of SAPHIRE, including the CsI, the a-Se photoconductor, and the FEA, can be made into a large area with moderate cost, and the detector can be assembled into the same thin and compact form as the AMFPI.

One particularly beneficial application of SAPHIRE is in the detection of breast cancer. Even with the most recent advances in mammography, 10-30% of breast cancers may be missed. The main reason that cancers are missed is because they are often obscured by radiographically dense, fibroglandular breast tissue. Recent developments in digital mammography, in which digital detectors replace screen-films, have demonstrated increased dynamic range, which can lead to improved diagnosis in women with dense breasts. Because of their rapid readout and geometric accuracy, digital mammography detectors have generated interests in digital tomosynthesis, where a rapid sequence of images (e.g. 11) are taken from different angles, and tomographic images at different depth of the breast are reconstructed. This imaging technique allows the radiologists to see through the "structural noise" of breast tissue that permits more accurate diagnosis. Tomosynthesis has posed a tremendous challenge for the technical development of digital mammography detectors, mainly in their ability to generate x-ray quantum noise limited images behind very dense breasts with less than 1/10 of the dose used in screening mammogram.

Except for scanning-slot digital mammography systems based on charge coupled devices (CCDs), the majority of existing digital mammography detectors are AMFPI based. Existing mammography AMFPI have the following two shortcomings: (1) the detector performance behind dense breast tissue is compromised by electronic noise, as the spatial frequency dependent detective quantum efficiency, DQE(f), which describes of the efficiency of an imaging detector in utilizing x-rays, is the gold standard for physical imaging performance of x-ray detectors. It has been shown that the DQE(f) of both direct and indirect AMFPI at ~1 mR (exposure behind dense tissue) can be <50% of that at 10 mR (mean exposure behind breast) or higher, which means that the detector is not x-ray quantum noise limited. This problem is expected to get worse when pixel size decreases and at the low dose used in tomosynthesis; and, (2) the pixel size currently used in AMFPI (70-100 µm) has an impact on the detection of the shape of micro calcifications. Although it has not yet been established what pixel size $d_{el}$ is required for digital mammography, it has been shown that with $d_{el}$=100 µm, characterization of the shape of calcification is compromised, while $d_{el}$=50 µm can preserve this information.

Currently, as stated above, several projects have been undertaken to overcome the above limitations. A first project is to optimize existing AMFPI by either increasing the signal or decreasing the electronic noise. The methods for increasing the signal include developing continuous photodiodes and optimizing CsI deposition for indirect AMFPI, or increasing electric field in a-Se detectors for direct AMFPI. It has been shown theoretically that these incremental changes will improve the DQE(f) behind dense breasts in screening mammography applications. However they will not be sufficient for tomosynthesis or if the pixel size is made smaller (e.g. 50 µm). The method for decreasing the electronic noise is to introduce pixel amplification by adding two more TFTs at each pixel, which can potentially lead to a twofold decrease in noise. This improvement is still insufficient and extremely difficult to implement for the small pixel size needed for mammography. And, a second project is the development of high conversion gain photoconductors for direct AMFPI. Promising candidate materials include lead iodide ($PbI_2$) and mercuric iodide ($HgI_2$). Both materials provide x-ray-to-charge conversion gain that is ~5-7 times higher than that of a-Se, which makes the AMFPI x-ray quantum noise limited for low exposures used in tomosynthesis. However these materials face two challenges. One is that the high gain necessitates a large pixel storage capacitor ($C_{st}$>10 pF) in order to hold the image charge generated in high exposure regions (e.g. near the skin line in screening mammography). This is impractical to make for small pixel sizes, and a large $C_{st}$ will significantly increase the pixel electronic noise and cancel the signal gain at low dose. The other challenge is that one type of charge carriers (electrons for $PbI_2$ and holes for $HgI_2$) does not have adequate range. This would lead to high probability of charge trapping in the photoconductors, which results in image artifacts (ghosting).

SAPHIRE employs a thin layer (0.5-25 µm) of avalanche a-Se photoconductor that is optically coupled to a needle-structured scintillator cesium iodide (CsI), and a field emitter array (FEA) to read out the charge image formed by a-Se. Its novelty is at least two fold: (1) avalanche provides amplification of signal at low dose (e.g. in tomosynthesis) where it is needed to overcome electronic noise and it can be reduced or turned off at higher exposures to ensure wide dynamic range; and (2) the FEA can potentially provide smaller pixel size (e.g. 50 µm) and higher readout speed than the TFT readout used in existing AMFPI.

Figure 6:
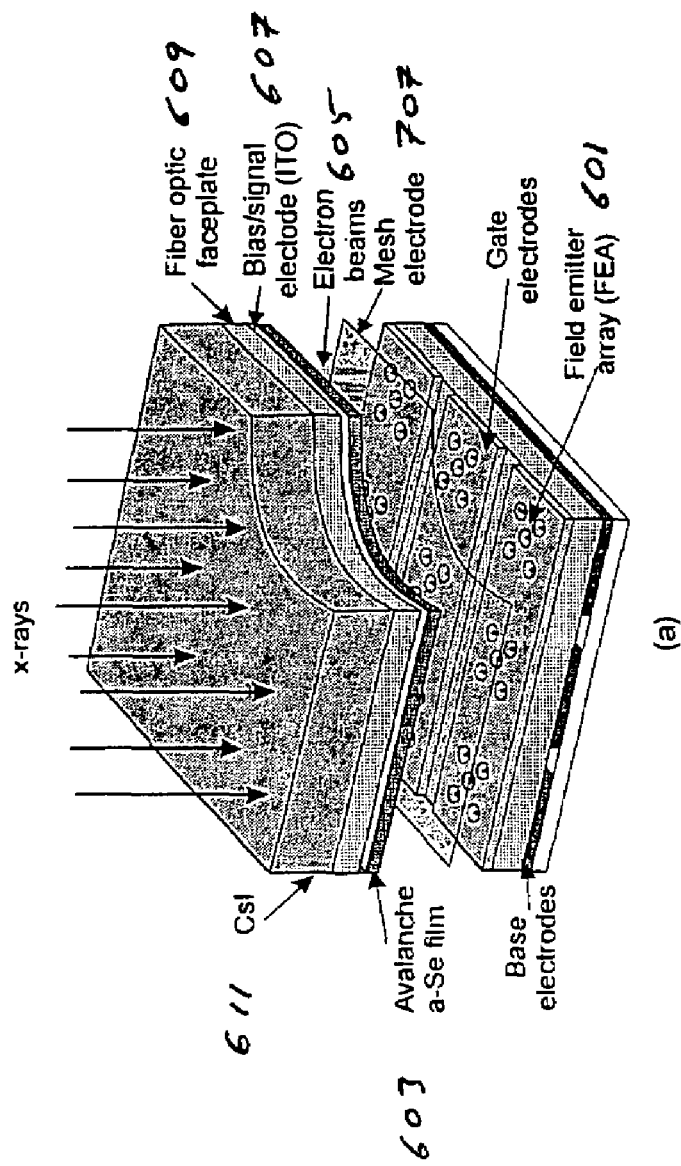
FIG. 6 is an exploded perspective illustration of the structure of an indirect AMFPI detector for use with an FEA readout.
Figure 7:
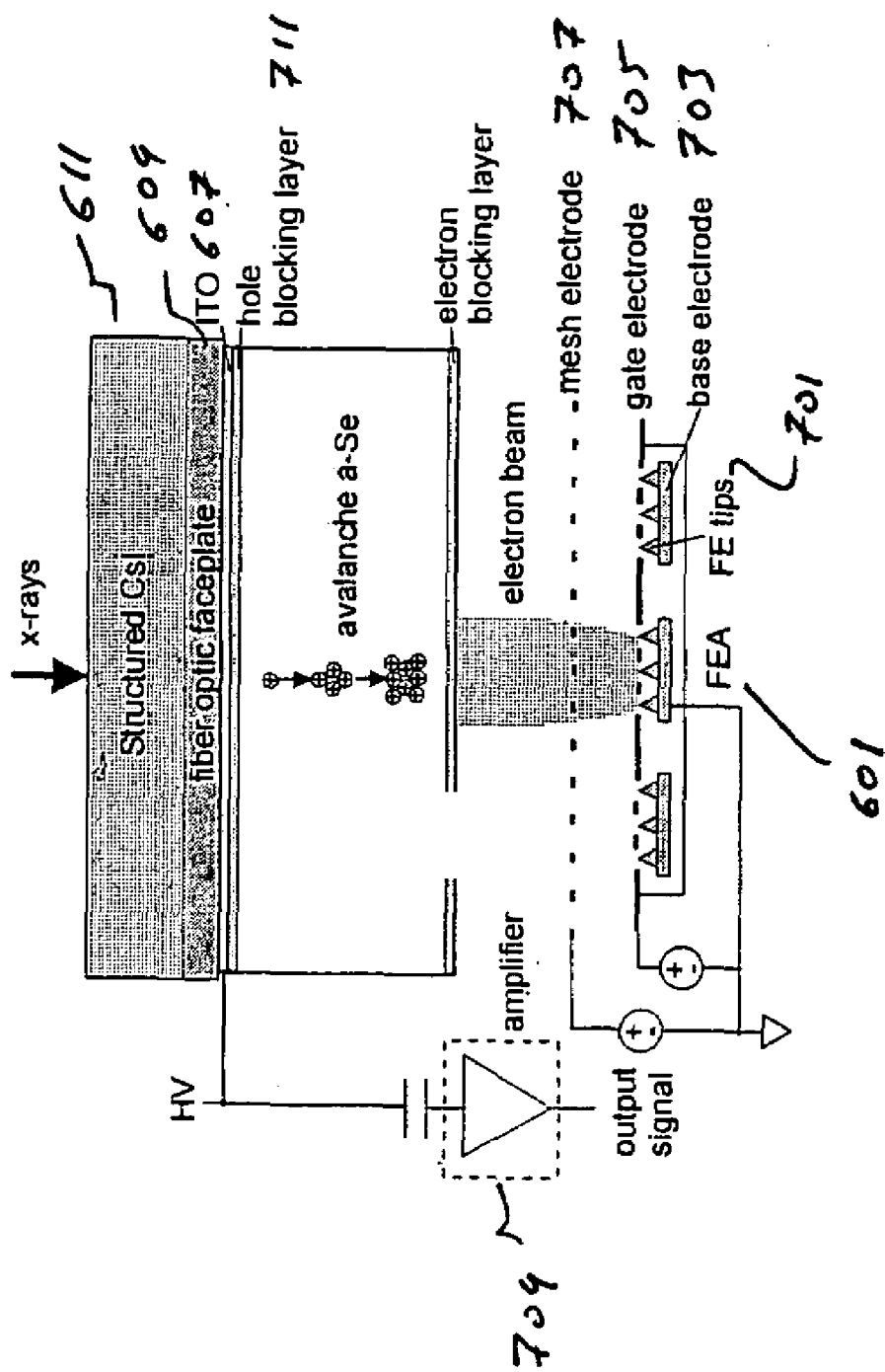
FIG. 7 is a cross-sectional view illustration depicting the structure of a detector for use with an FEA readout.

FIG. 6 is an exploded perspective illustration of the structure of an indirect AMFPI detector for use with an FEA readout according to an embodiment of the present invention. FIG. 7 is a cross-sectional view illustration depicting the structure of a detector for use with an FEA readout and includes a schematic diagram according to an embodiment of the present invention.

With reference to FIGS. 6 and 7, the structure of an indirect FPI detector incorporating an FEA readout is shown. The FPI incorporates a field emitter array (FEA) 601 that has been used for optical imaging but has not been used for AMFPI. The charge (hole) image formed on the bottom surface of the a-Se film 603 is read out using electron beams 605 generated from a two-dimensional FEA 601 with principles similar to those used in a camera tube. FEA 601 is essentially a flat electron source and is an emerging technology for large-area flat-panel field emission displays (FED). As shown in FIGS. 6 and 7, the field emitter (FE) tips 701 (with spacing of <1 μm) are connected to column base electrodes 703, and rows of gate electrodes 705 are used for control of field emission. The overlapping area between each base electrode 703 and gate electrode 705 defines the pixel size.

Unlike TFT arrays, where reducing pixel size involves making smaller TFTs with the resulting exponential increase in cost, smaller pixel FEAs only require thinner passive addressing lines and essentially no increase in cost. Even with $d_{el}$=50 μm, sufficient FE tips 701 are included in each pixel. The electron beams for each pixel are turned on by a positive potential between the gate electrodes 705 and the base electrodes 703 (e.g., 60V). A mesh electrode 707, which is at a short distance above the FEA 601, accelerates and shapes the electron beams so that they land vertically (without spreading) on the free surface of the a-Se 603 until the surface potential returns to zero. The total amount of charge is measured by an amplifier 709 connected to a bias/signal electrode 607 (ITO), which forms the output signal. The CsI 611 is coupled to the ITO 607 via fiber optic faceplate 609. The hole-blocking layer 711 is also shown in FIG. 7.

In operation, an electric field of $E_{Se}$>100 V/μm can be applied to the a-Se. This $E_{Se}$ is an order of magnitude higher than that typically used in direct a-Se x-ray detectors, and can generate avalanche multiplication in a-Se by impact ionization. Stable and uniform avalanche multiplication has been observed with very little added noise. The potential use of thick HARP layers (e.g. 500 μm) as direct x-ray detectors has been investigated and was found to be undesirable due to the depth dependence of avalanche gain (due to x-ray interactions at different depth) and its significant degrading effect. In the present invention, an indirect detector is proposed, where a thin HARP layer is coupled to CsI through a fiber optic faceplate. The light photons emitted from the CsI transmit through the transparent indium tin oxide (ITO) bias electrode of HARP and generate electron-hole pairs in a thin a-Se layer close to the top interface. Under a sufficiently high $E_{Se}$ (by applying positive voltage on ITO), holes move towards the bottom surface, and all experience the same avalanche multiplication gain. The avalanche gain $g_{av}$ ranges from 1-800 depending on $E_{Se}$ and the thickness of the a-Se layer, $d_{Se}$. When the holes reach the bottom surface, they form a charge image, which is read out using electron beams generated from a two-dimensional FEA with principles similar to that in a camera tube. FEA is essentially a flat electron source, and is an emerging technology for large area flat-panel field emission displays (FED). The electron beams for each pixel are turned on by a positive potential between the gate and the base electrodes (e.g. 60 V). The mesh electrode, which is at a short distance above the FEA, accelerates and shapes the electron beams so that they land vertically (without spreading) on the free surface of the a-Se until the surface potential returns to zero. The total amount of charge is measured by an amplifier connected to the ITO and forms the output signal.

All of the detector components of the SAPHIRE, including the CsI, the a-Se photoconductor and the FEA, can be made into large area with moderate cost, and the detector can be assembled into the same thin and compact form as AMFPI. Although the operation of FEA requires vacuum, modern FED assembly technology allows the active area to be very near the edge of the detector, so that the dead space along the wall is minimal. By using an angled fiber optic faceplate to couple CsI to HARP, the dead space along the wall can be further reduced.

Compared to existing AMFPI based on TFTs, the FEA readout method of SAPHIRE has the following advantages: (1) higher radiation resistance because FEA has no radiation sensitive components; (2) lower cost when making smaller pixels (e.g. $d_{el}$=50 μm); (3) no danger of high voltage damage; and (4) potentially higher readout speed. The avalanche photoconductor of SAPHIRE provides several additional advantages: (1) x-ray quantum noise limited at much lower x-ray exposure level; (2) better DQE(f) at high spatial frequencies by using HR (i.e. optimized for high resolution at the cost of reduced conversion gain) CsI layers, which due to its lower light output has not been used in existing AMFPI; (3) programmable gain by changing the electric field $E_{Se}$ as opposed to the constant conversion gain of the metal iodides ($HgI_2$ or $PbI_2$); and (4) better temporal performance because both charge carriers in a-Se have adequate range and the probability of charge trapping is lower than in a-Si, $PbI_2$ or $HgI_2$ films.

Figure 8:
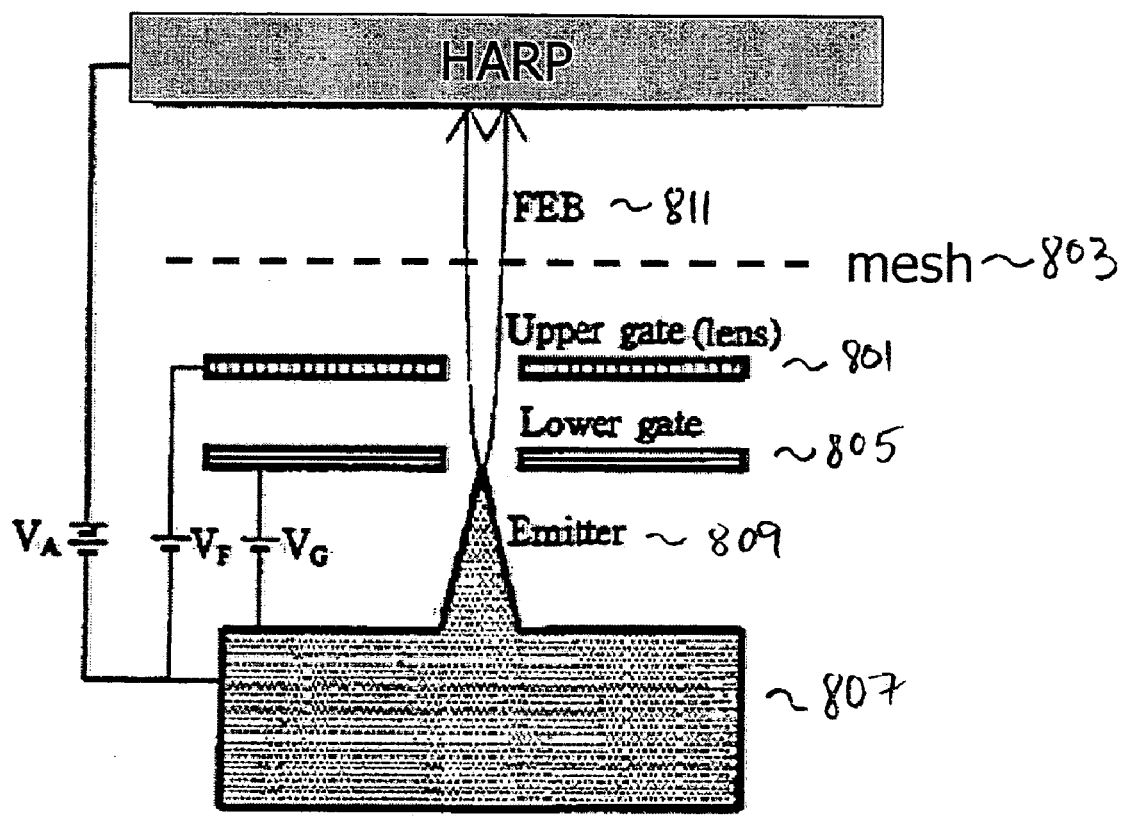
FIG. 8 is a diagram illustrating an electron beam-focusing electrode included in the detector according to an embodiment of the present invention.

FIG. 8 is a diagram illustrating an electron beam-focusing electrode included in the detector according to an embodiment of the present invention. The resolution of SAPHIRE should ideally depend only on the pixel size of the FEA 804. However the electron beam could spread laterally after emitted from the FEA tip (emitter) 809. Without proper focusing, the lateral spread of the electron beam (FEB) 811 could be 70 microns from each side, making it unsuitable for pixel size less than 200 microns. By adding integrated focusing electrodes 801 at a short distance (e.g. 1 micron or less) above the gate electrode 805, the electrons emitted with a divergent angle (which tend to spread laterally while traveling towards the target) will be deflected and move vertically. The lateral spread will reduce from 70 micron to less than 2 microns with addition of the focusing electrodes 801.

Compared to existing indirect FPI, SHARP-AMFPI have the following advantages: (1) x-ray quantum-noise limited at much lower x-ray exposure level; (2) better temporal performance, i.e., smaller image artifacts due to lag and ghosting; (3) compatible with standard TFT array manufacturing facility for AMLCD; and (4) compatible with high-resolution type CsI, which cannot be used in existing FPI due to its lower gain.

Additionally, because of the lower trap density in a-Se combined with much higher electric field $E_{se}$, less trapping and hence less lag and ghosting is expected.

Compared to the high conversion gain x-ray photoconductors being developed for direct FPI, the present invention has the advantage of programmable gain by changing the electric field $E_{se}$ as opposed to the constant conversion gain of $HgI_2$ or $PbI_2$. One of the practical problems of having large gain for $HgI_2$ and $PbI_2$ is that the signal charge (at high exposure) requires a large pixel storage capacitor (>15 pF), which is impractical to make especially for small pixel sizes. This means that a detector that works well with low-dose x-ray imaging applications may not work properly with high radiation dose, thereby compromising the dynamic range of the system and its clinical applications. Thus, by decreasing $E_{se}$ during high exposure applications, the signal charge is compatible with that at low dose with avalanche gain. This simplifies the TFT array pixel design and results in a detector with wide dynamic range.

Another advantage of the present invention as compared to the high conversion gain x-ray photoconductors being developed for direct FPI is that it has better temporal performance. This is because both charge carriers in a-Se have adequate range and the probability of charge trapping is low, as opposed to the very short range of one type of carriers in $PbI_2$ (electrons) and $HgI_2$ (holes), which results in significant charge trapping and ghosting.

The aforementioned advantages make the proposed detector suitable for all x-ray imaging modalities (i.e., radiography and fluoroscopy).

In addition to the advantages offered by avalanche gain, SAPHIRE using FEA readout has the following advantages over the TFT readout method: (1) higher radiation resistance because FEA has no radiation-sensitive components; (2) lower cost when making smaller pixels (e.g., $d_{ei}$=50 μm); (3) no danger or high voltage damage; and (4) potentially higher readout speed.

During the manufacturing of the SHARP-AMFPI the following aspects need to be considered. The CsI scintillator should be manufactured on a separate substrate and couple to the HARP avalanche detector deposited on a TFT array. This allows separate optimization of CsI and the HARP. Since HARP layer cannot sustain temperature higher than 70 degrees Celsius, and CsI layers with good imaging properties requires substrate temperature of 200 degrees, it is not optimal to deposit CsI directly onto HARP. The TFT design also should incorporate: (1) pixel level high voltage protection with a simple dual-gate TFT design that allows pixel potential to rise to 80 V; and (2) a pixel storage capacitor that is typically 0.3 pF or smaller, which allows the pixel potential to rise as a function of exposure and the avalanche gain automatically decreases at high exposure to avoid damage to the HARP layer under sustained high current.

Means of establishing good spatial uniformity of imaging performance should also be considered since the HARP will have spatial non-uniformity to a certain extent (due to thickness variations, most often seen as thickness in the center and thinner in the periphery). By resetting the pixels to different potentials can change the bias voltage in different areas and keep the electric field within different region constant. This will improve the uniformity in avalanche gain.

Means of planarizing the TFT array to reduce the possibility of point defects is also considered by spinning a resistive film coated over the TFT array to improve smoothness at sharp corners of pixel electrodes.

Each of the electron and hole blocking layers are incorporated to minimize charge injection at avalanche field.

A programmable gain can be accomplished as the bias potential on the ITO electrode will be lowered when the detector is switched from low dose (e.g. fluoroscopy) to high dose (e.g. radiographic) applications, so that the avalanche gain can be lowered or completely turned off. This ensures large detector dynamic range without saturation of the pixels, which is a problem for FPI with constant high gain.

For the SAPHIRE embodiment, the HARP target incorporates a FOP substrate (for high spatial resolution applications) or a very thin glass substrate (for low spatial resolution applications), a HARP multilayer structure (including ITO electrode, hole blocking layer, a-Se avalanche layer, and electron blocking layer). An optimized CsI layer will be optically coupled to the FOP substrate through direct contact. The HARP target is placed at a short distance above a FEA, with a mesh electrode inserted in between. The ITO electrode for the HARP target is divided into stripes, each of which connected to an integrated external amplifier (current or charge). The division of ITO electrode is for three purposes: (1) reduce the input load capacitance to amplifier, (2) allow application of different bias potential to improve spatial uniformity in avalanche gain; and (3) allow parallel readout by switching on a row of FEA pixels at the same time. The FEA pixel consists of a group of FEA tips, the base and gate electrodes, and a focusing electrode for reducing the spread of electron beams.

While the invention has been shown and described with reference to certain preferred embodiments thereof, various changes in forms and details may be made within the scope of the present invention. Accordingly, the scope of the present invention should not be limited to the embodiments described in the specification but to the appended claims or its equivalents.

What is claimed is:

1. A flat panel detector, comprising:
    a phosphor screen for receiving x-rays and converting the x-rays into optical photons;
    an avalanche photoconductor for receiving the optical photons and converting the optical photons into electrical charges, the avalanche photoconductor having an avalanche gain programmable by changing an electric field applied across the avalanche photoconductor; and
    an active matrix array for detecting the electrical charges.

2. The flat panel detector of claim 1, wherein the phosphor screen is structured cesium iodide (CsI).

3. The flat panel detector of claim 1, wherein the avalanche photoconductor is amorphous selenium (a-Se).

4. The flat panel detector of claim 1, wherein the active matrix array is comprised of one of thin film transistors and field emitters.

5. A flat panel detector, comprising:
    a phosphor screen of structured cesium iodide (CsI) for converting x-rays into photon charges;
    an avalanche photoconductor layer of amorphous selenium (a-Se) for receiving the photon charges and converting the photon charges into electrical charges, the avalanche photoconductor having an avalanche gain programmable by changing an electric field applied across the avalanche photoconductor; and
    an active matrix of thin film transistors for detecting the electrical charges.

6. The flat panel detector of claim 5, further comprising an optical coupling located between the phosphor screen and the avalanche photoconductor layer.

7. The flat panel detector of claim 6, further comprising a transparent indium tin oxide layer located between the optical coupling and the avalanche photoconductor layer.

8. The flat panel detector of claim 7, further comprising a layer of cerium oxide located between the transparent indium tin oxide and the avalanche photoconductor layer.

9. The flat panel detector of claim 8, wherein a thin layer of the avalanche photoconductor layer, adjacent to the layer of cerium oxide layer, is doped with lithium fluoride.

10. The flat panel detector of claim 5, further comprising a thin layer of antimony trisulfide located between the avalanche photoconductor layer and the active matrix of thin film transistors.

11. A flat panel detector, comprising:
- a phosphor screen of structured cesium iodide (CsI) for converting x-rays into photon charges;
- an avalanche photoconductor layer of amorphous selenium (a-Se) for receiving the photon charges and converting the photon charges into electrical charges; and
- an active matrix of field emitters for detecting the electrical charges.

12. The flat panel detector of claim 11, further comprising an optical coupling located between the phosphor screen and the avalanche photoconductor layer.

13. The flat panel detector of claim 12, further comprising a transparent indium tin oxide layer located between the optical coupling and the avalanche photoconductor layer.

14. The flat panel detector of claim 13, further comprising a hole-blocking layer located between the transparent indium tin oxide and the avalanche photoconductor layer.

15. The flat panel detector of claim 14, further comprising an electron-blocking layer located between the avalanche photoconductor layer and the active matrix of field emitters.

16. The flat panel detector of claim 11, further comprising a mesh electrode located between the avalanche photoconductor layer and the active matrix.

17. The flat panel detector of claim 16, further comprising a focusing electrode located between the mesh electrode and the active matrix.

* * * * *